(12) United States Patent
Bassett

(10) Patent No.: US 6,564,291 B1
(45) Date of Patent: May 13, 2003

(54) MULTI-FUNCTION PERIPHERAL STORAGE DEVICE BUFFER SYSTEM

(75) Inventor: Stephen J. Bassett, Fort Collins, CO (US)

(73) Assignee: Texas Instruments Incorporated, Dallas, TX (US)

( * ) Notice: Subject to any disclaimer, the term of this patent is extended or adjusted under 35 U.S.C. 154(b) by 81 days.

(21) Appl. No.: 09/716,064

(22) Filed: Nov. 17, 2000

(51) Int. Cl.[7] .............................................. G06F 12/00
(52) U.S. Cl. .......................... 711/111; 711/113; 710/58
(58) Field of Search ............... 711/111, 113; 710/56–74; 360/51

(56) References Cited

U.S. PATENT DOCUMENTS

| 4,399,503 A | * | 8/1983 | Hawley ...................... 711/113 |
| 5,727,232 A | * | 3/1998 | Iida et al. ..................... 710/56 |
| 5,758,191 A | * | 5/1998 | Kasebayashi et al. ......... 710/56 |
| 5,991,835 A | * | 11/1999 | Mashimo et al. ............. 710/58 |

* cited by examiner

Primary Examiner—Do Hyun Yoo
Assistant Examiner—Nasser Moazzami
(74) Attorney, Agent, or Firm—W. Daniel Swayze, Jr.; W. James Brady; Frederick J. Telecky, Jr.

(57) ABSTRACT

The present invention provides a multi-function buffer system for use in a peripheral storage device system, as well as a peripheral storage device system having a multi-function buffer system. The buffer system comprises a multi-purpose memory component which may be adapted for use as scratchpad and/or instruction storage accessible by a controller processor, as well as for buffering information being transferred between the peripheral storage device and a host computer system.

11 Claims, 4 Drawing Sheets

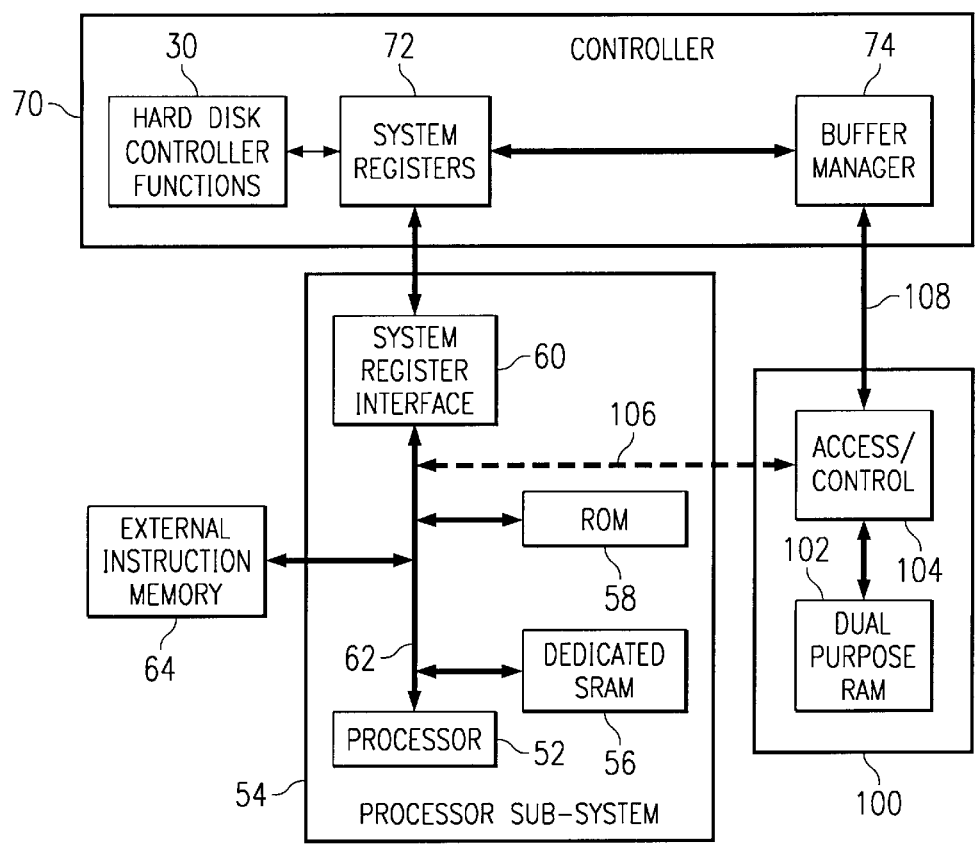
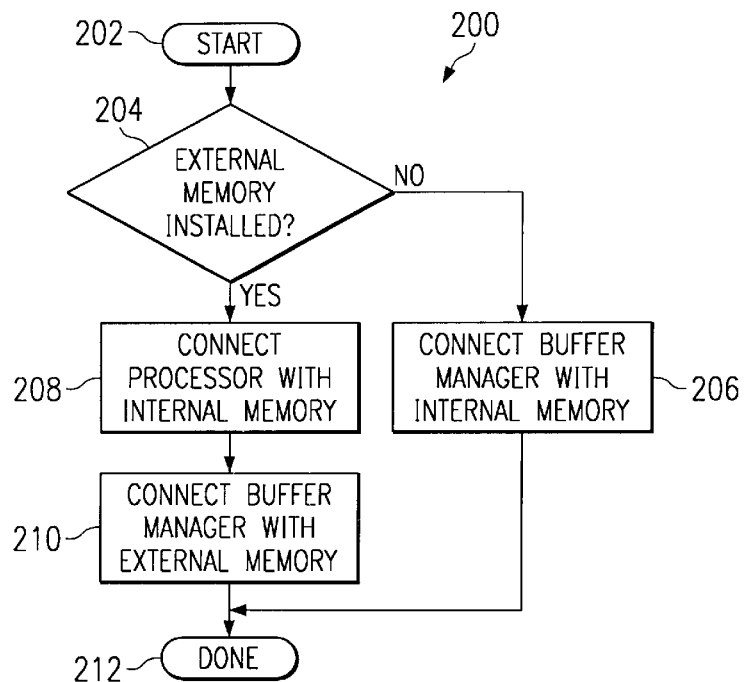

MULTI-FUNCTION PERIPHERAL STORAGE DEVICE BUFFER SYSTEM

TECHNICAL FIELD

The present invention relates to peripheral storage devices and, more particularly, to a multi-function buffer system for use in a peripheral storage device.

BACKGROUND OF THE INVENTION

Hard disk drives and other peripheral storage devices have become a standard feature in most computer systems. Such devices provide mass storage functionality for a host computer, and may include hard disk drives, CDROM drives, tape drives, optical disk memory devices, floppy disk drives, and the like. For example, hard disk drives include one or more magnetically coated platters used for storing program instructions, data, and other information used by the computer system. One or more such platters may be configured in a stack, which may be rotated by a spindle or servo motor. A space is provided between each platter to allow an arm having a read/write head to be positioned on each side of each platter such that information may be stored and retrieved. Information may be stored on one or both sides of the platters, which are generally organized into sectors, tracks, zones, and cylinders.

The read/write heads may be mounted onto one or more suspension arms whereby each of the read/write heads may be positioned as desired. The suspension arms may be coupled together at a voice coil motor (VCM) to form one unit or assembly that is positionable by the voice coil motor. The voice coil motor positions the suspension arms so that an active read/write head is properly positioned for reading or writing information. The read/write heads may thus be positioned between an inner diameter and an outer diameter of the platters in a controlled fashion to access data stored thereon.

Hard disk drives and other types of peripheral storage devices also include a variety of electronic control circuitry for processing data and for controlling its overall operation, including a hard disk controller. For example, the controller may include a processor, a pre-amplifier, a read channel, a write channel, a servo controller, a motor control circuit, a read-only memory (ROM), a random-access memory (RAM), and a variety of disk control circuitry to control the operation of the hard disk drive and to properly interface the hard disk drive to a bus in a host computer system. The disk control circuitry generally includes a processor (e.g., a DSP, microprocessor, microcontroller, or the like) for executing instructions stored in memory to control the operation and interface of the hard disk drive.

Hard disk drives and other peripheral storage devices perform write, read, and servo operations when storing and retrieving data. Generally, a write operation includes receiving data from a system bus and storing the data on the platters. In a read operation, the appropriate sector to be read is located and data that has been previously written to one or more platters is read. The data is then provided to the host computer system. The disk drive may further comprise some form of buffer memory to buffer or temporarily store information on its way from the host system to the storage media (platters) and/or on its way from the media to the host system. In addition, the control circuitry may include instruction memory (e.g., ROM, EEPROM, FLASH, and the like) used for storing firmware instructions for execution by the controller processor, and execution memory (e.g., SRAM) used for storing temporary variables, intermediate results, and the like (scratchpad).

Sometimes, buffer memory is used to store executable instructions as well as to buffer transferred data. For instance, the buffer memory may be used to store updated firmware, which may be executed by the controller processor while the instruction memory is rewritten to include the updated firmware instructions. Thereafter, the controller processor may execute normally by fetching the updated firmware instructions from the instruction memory, whereby the buffer memory is again free for other usage as a buffer for transferred information.

Such buffer memory has heretofore primarily been external to the peripheral storage device controller. The controller accesses the external buffer memory via a buffer manager in the controller circuit. Whereas the primary purpose of such buffer memory is for temporary storage of information in transit to or from the platters, firmware instructions are commonly stored in the buffer, for instance, those instructions associated with small and/or low speed functions.

Peripheral storage devices, such as disk drive products are desired for a variety of different applications, each having different performance requirements. For instance, some disk drive applications are cost sensitive, and may sacrifice performance (e.g., by providing only a small amount of processor RAM) in favor of reduced cost, while providing an integral buffer memory for temporary storage of information being transferred. Other less cost sensitive applications may require a large amount of buffer memory (e.g., beyond the amount which may be easily integrated into the controller circuitry), as well as more processor instruction execution RAM. The high performance applications may tend to use a buffer RAM sufficiently large as to make integration not cost-effective when discrete or external RAM options are less expensive.

Peripheral storage device manufacturers accordingly have made efforts to keep product costs low and at the same time to maximize product performance, across product lines with offerings for a variety of cost/performance goals. However, some tradeoffs are inevitable. For example, integration of memory into a controller circuit may provide improved access time performance, but may increase the cost compared with external memory devices. While such tradeoffs may be made on a product-by-product basis, further cost reduction across an entire product line may be realized through the provision of components common to two or more peripheral storage device products, each of which has different cost/performance design goals. Thus, there is a need for improved peripheral storage device controller circuits providing reduced cost across a product line of drive controllers having diverse performance/cost design goals.

SUMMARY OF THE INVENTION

The present invention provides a multi-function buffer system comprising an integrated memory, which may be adapted for use as instruction memory, scratchpad RAM, and/or as an information buffer. For instance, the integrated memory may be employed by a processor for storage of instructions (e.g., instruction space) and/or data (e.g., data space or 'scratchpad' memory). Alternatively or in combination, the integrated memory may be employed by a buffer manager to buffer or store information being transferred between a peripheral storage device and a host computer. The multi-function memory may thus be employed in both low and high performance peripheral storage devices, allowing reduced cost across multiple product offerings. The buffer system may provide interfacing from the integrated memory to the controller buffer manager or to a processor. Thus, the buffer system may be employed to provide buffer memory via the buffer manager in cost sensitive peripheral storage devices.

Additional interfacing may be provided to an external buffer memory. Where an external buffer memory is provided in the peripheral storage device, the buffer system may provide access between the external buffer memory and the buffer manager, while also providing access between the processor and the internal memory. For high performance peripheral storage devices, therefore, the buffer system allows use of a large external buffer memory via the buffer manager, as well as the addition of processor execution memory for scratchpad or instruction storage use via the processor. Thus, the invention provides a versatile buffer system adaptable to various applications having diverse and/or disparate performance goals and requirements, while achieving lower cost associated with universally applicable components.

The selective access to the internal memory device, as well as the access to the external buffer memory device may be provided by an access control device in the buffer system. The control device may be configured to provide electrical communication between the internal memory device and one of the processor and the buffer manager. For instance, where no external buffer memory exists in the peripheral storage device system, the control device may provide access between the internal memory and the buffer manager, whereby buffer memory is provided to the peripheral storage device. The invention further contemplates a peripheral storage device system, as well as a methodology for providing buffer memory in a peripheral storage device system.

One aspect of the invention provides a peripheral storage device buffer system, comprising a memory device and a control circuit or device. The buffer system may be electrically connected or associated with a processor and a buffer manager associated with a peripheral storage device system. The control circuit selectively provides access with the memory device to the buffer manager and/or the processor. In this way, the buffer system may be used in a variety of situations for peripheral storage device systems having various cost and/or performance goals.

According to another aspect of the invention, the buffer system may be employed as an interface to a second memory device, such as an external buffer memory. The control circuit may connect the first memory device with the processor and connect the second memory device with the buffer manager according to a control state. For instance, if the second memory device is present in the peripheral storage device system, the second memory device may employed as buffer memory accessible by the peripheral storage device buffer manager, with the first memory device acting as processor execution memory for scratchpad and/or instruction storage purposes. If no second memory device is present, the control circuit may connect the first memory device with the buffer manager to act as buffer memory.

According to still another aspect of the invention, a peripheral storage device system is provided having a peripheral storage device, a controller, a processor, and a peripheral storage device buffer system. The buffer system comprises a first memory device and a control circuit adapted to selectively provide electrical communication between the first memory device and one of a buffer manager and the processor. The peripheral storage device system may further comprise a second memory device in electrical communication with the buffer system. In this case, the buffer system control circuit may provide electrical communication between the first memory device and the processor, and between the second memory device and the buffer manager.

According to yet another aspect of the invention, a method is provided for providing buffer memory in a peripheral storage device system. The method comprises connecting a buffer system with a buffer manager and a processor associated with the peripheral storage device system, wherein the buffer system includes a first memory device and a control device with a control state associated therewith. The method further comprises providing electrical communication between the first memory device and the processor using the control device if the control state is in a first state, and providing electrical communication between the first memory device and the buffer manager using the control device if the control state is in a second state. In addition, the method may comprise selectively providing electrical communication between a second memory device associated with the peripheral storage device system and the buffer manager using the control device if the control state is in the first state.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 6 is a schematic illustration of the exemplary buffer system of FIG. 5, without the external data buffer; and FIG. 7 is a schematic illustration of an exemplary method in accordance with another aspect of the invention.

DETAILED DESCRIPTION OF THE INVENTION

Figure 1:
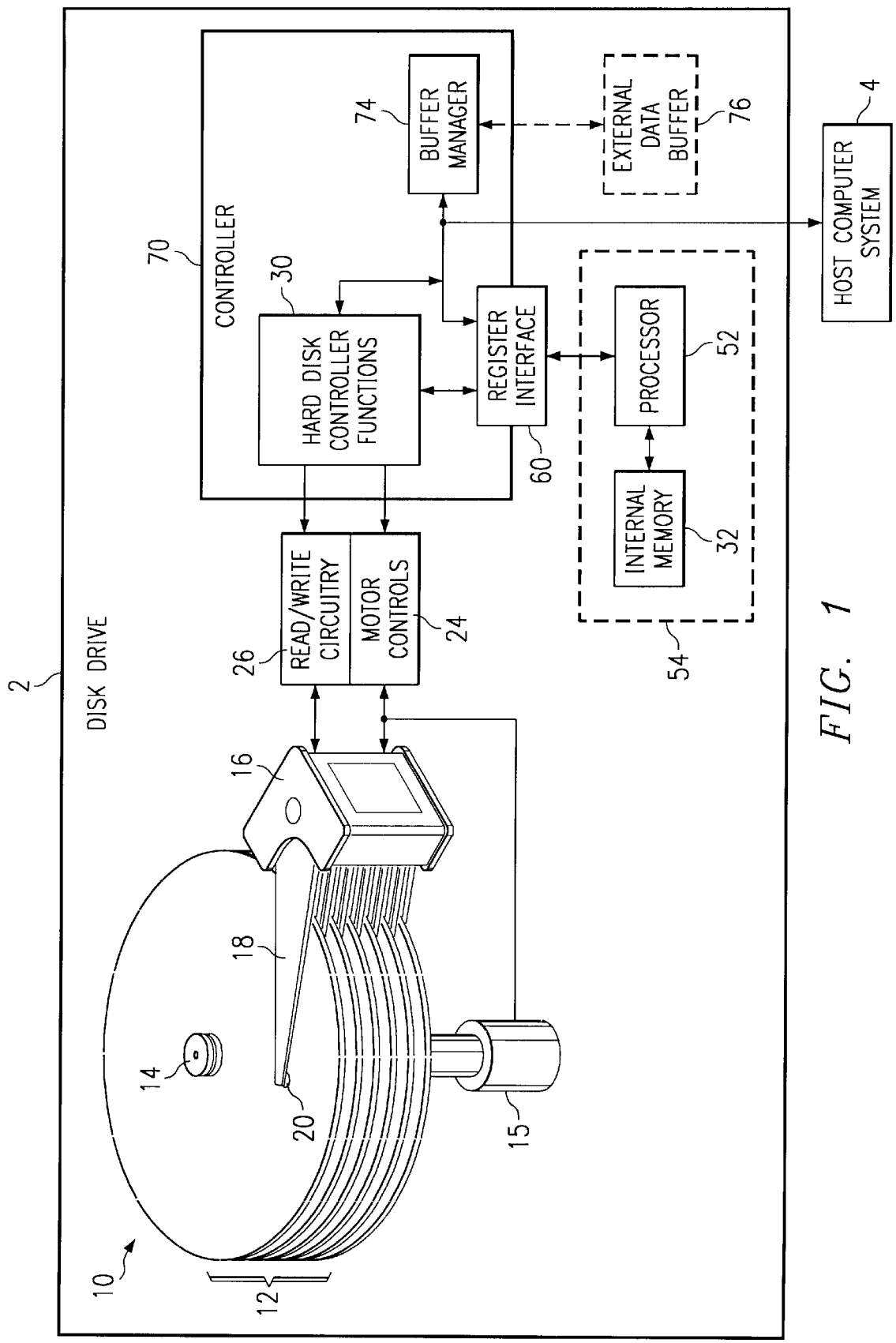
FIG. 1 is a schematic illustration of an exemplary peripheral storage device system in which one or more aspects of the present invention may be employed.

The present invention will now be described with respect to the accompanying drawings in which like numbered elements represent like parts. The invention comprises a universal, multi-function peripheral storage device buffer system adaptable to provide buffer and/or instruction memory in a peripheral storage device controller. In order to provide context for the invention, FIG. 1 illustrates an exemplary disk drive system 2 adapted to provide mass storage for a host computer system 4. The system 2 includes a disk drive 10 having a stack of magnetically coated platters 12 used for storing information. Platters 12 are mounted together in a stacked position for rotation about a platter spindle 14 via a spindle or servo motor 15. A space is provided between each platter to allow an arm 18 having a read/write head 20 associated therewith, to be positioned on each side of each platter 12 so that information may be stored and retrieved. Information is stored on each side of each platter 12 and is generally organized into sectors, tracks, zones, and cylinders (not shown).

The read/write heads 20 are mounted to one end of dedicated suspension arms 18 whereby the read/write heads 20 may be positioned in a controlled fashion. The opposite ends of the suspension arms 18 are coupled together at a voice coil motor 16 (VCM) to form one unit or assembly that is positionable by the voice coil motor 16. The voice coil motor 16 controllably positions the suspension arms 18 whereby an active read/write head 20 is positioned for reading or writing information. As illustrated and described in greater detail hereinafter, the drive 10 may also comprise electronic motor control and read/write circuitry 24 and 26, respectively, as well as a controller 70, for processing data and for performing hard disk control functions 30. The motor control circuitry 24 provides for controlled movement of the read/write heads 20 using suspension arms 18 and the voice coil motor 16, as well as for rotational movement of the platters 12 about the spindle 14 using the spindle motor 15.

The read/write circuitry 26 provides for controlling the electrical read and write operations of the read/write heads 20, and for transporting data to and from the read/write heads 20. The motor control circuitry 24 and the read/write circuitry 26 are operatively associated with the hard disk controller functions 30, which interface with a processor 52 via a register interface 60 in a processor sub-system 54. The processor 52 may comprise, for example, a microcontroller, microprocessor, digital signal processor (DSP), or other type of processor, which is adapted to perform one or more tasks according to program instructions, which may be stored in an internal memory system 32. The internal memory 32 may further be adapted for storage of temporary variable data and other information associated with the execution of a program in the processor 52, whereby a portion of the memory 32 may be employed as a processor scratchpad memory. The processor sub-system 54 may further be integrated within the controller 70.

The controller 70 may be programmed by the processor 52, for example, via one or more control registers (not shown) through the register interface 60, to operate the motor controls 24 and the read/write circuitry 26, as well as to interface with the host computer system 4 and to perform other hard disk controller functions 30. The processor 52 may be adapted to execute program instructions from the memory 32 to perform various tasks associated with the operation of the disk drive 2, wherein such program instructions are created according to programming techniques as are known. The controller 70 may further comprise a buffer memory manager component 74, which is operable to interface the controller 70 with an external data buffer memory device 76. In this regard, the data buffer device 76 may be used by the controller to buffer data being transferred between the host computer system 4 and the disk drive 10, and/or for storage of program instructions to be executed by the processor 52.

Figure 2:
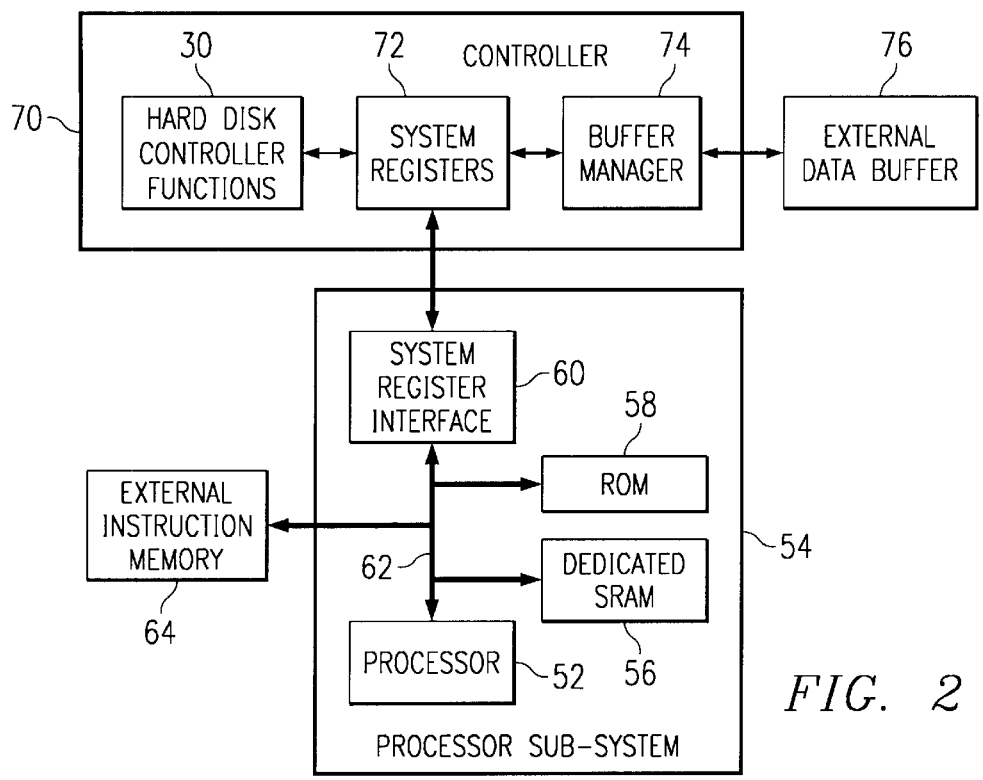
FIG. 2 is a schematic illustration of a disk drive system controller, processor, and associated memory system.

Referring now to FIG. 2, the disk drive processor sub-system 54 and associated memory is illustrated. The processor 52 is provided in a processor subsystem 54, together with a dedicated SRAM device 56, a ROM 58, and a system register interface 60. The processor communicates with the devices 56, 58, and 60 via a bus 62, which may comprise separate address and data busses (not shown), or which may comprise a single combination address and data bus. The processor 52 executes program instructions which may be stored in the ROM 58 and/or in an external instruction memory 64 connected to the processor bus 62. The memory 64 may comprise various memory forms, such as ROM, RAM, flash, EEPROM, and the like. The SRAM 56 may be used for storage of temporary variable or other data to provide scratchpad memory to the processor 52.

It will be noted that the SRAM 56, ROM 58, and the external instruction memory 64 may together comprise the internal memory 32 of FIG. 1. It will be further noted that the processor 52 may load executable instructions from one or both of the memory devices 58 and 64 into the SRAM 56 for execution therefrom, for example, in order to reduce instruction fetching time.

The processor sub-system 54 communicates with the controller 70 by reading and/or writing to one or more system registers 72 in the controller 70 via the system register interface 60. Access may thus be provided between the processor sub-system and a buffer manager 74 in the controller 70. The buffer manager in turn, may be electrically connected to an external data buffer memory device 76 associated with the host disk drive system (e.g., system 2 of FIG. 1). The buffer manager 74 may comprise, for example, a DRAM controller device, which provides a parallel data interface to an external DRAM, such as the external data buffer 76. In this regard, the buffer manager 74 may perform various functions including DRAM refreshing, error correction and error detection as are known. The external data buffer 76 may be employed for buffering or temporary storage of data (not shown) being transferred to or from the disk drive (e.g., drive 10 of FIG. 1). The buffer manager 74 may thus provide interfacing between the data buffer 76 and one or more of the processor sub-system 54, a host computer system (e.g., computer system 4 of FIG. 1), and the disk drive 10.

The disk drive controller 70 manages how data is extracted or read from and written to the associated disk drive (e.g., drive 10) and performs other hard disk controller functions 30. The controller 70, for example, may control the operation of the associated read/write circuitry 26, as well as the spindle and voice coil motors for spinning the disk and controllably positioning the read/write heads, respectively via the control circuit 24 (FIG. 1). In addition, the controller 70 may implement error correction and detection techniques, which are applied to the data or information being stored onto or retrieved from disk. The controller 70, moreover, provides for data interleaving, as well as interfacing with the host computer system (e.g., system 4 of FIG. 1).

In operation, the ROM 58 may comprise boot up code, which the processor 52 runs upon powering up. To increase instruction fetching speed, program instructions may then be loaded from the external instruction memory device 64 into the dedicated SRAM device 56, from which the processor 52 fetches these instructions thereafter. Certain instructions may be stored in the external data buffer 76, for example, where small or slower functions do not require fast processor fetching. The external data buffer 76 may thus be employed for temporary storage (e.g., buffering) for data being transferred to and from disk, as well as for processor execution memory. It will be recognized, however, that due to the latency of processor access to the external data buffer device 76 (e.g., via the interface 60, system registers 72, and buffer manager 74), that the device 76 may not provide effective storage capacity for instructions or scratchpad memory, where the performance of the processor 52 is time sensitive.

The processor 52 may further operate using instructions from one of the external instruction memory 64 and the ROM 58 to boot up and thereafter download further operating firmware instructions from the disk drive 10, using a portion of the disk memory not accessible for general data storage use. In this fashion, the firmware portion of the disk memory in disk drive 10 may be overwritten, for example, for in-field firmware upgrades. In this case, the external instruction memory need not be non-volatile or re-writable. In addition, it will be recognized that some disk drive applications may require large external data buffers, whereas others may require only a small buffer, depending on performance and cost design goals Thus, in some disk drive system applications, it may be desirable to provide only a small data buffer, such as where the design is cost sensitive, where the speed requirements for the disk drive are not critical, or where the speed requirements for the disk drive can be achieved with integrated buffer memory. In other applications, performance may need to be enhanced, possibly at the expense of added cost. For example, high performance disk drive specifications may require large amounts of buffer memory for data being transferred to and from disk, as well as large amounts of fast access, execution memory for the processor. In this situation, it may therefore be desirable to provide additional processor memory and additional buffer memory.

Figure 3:
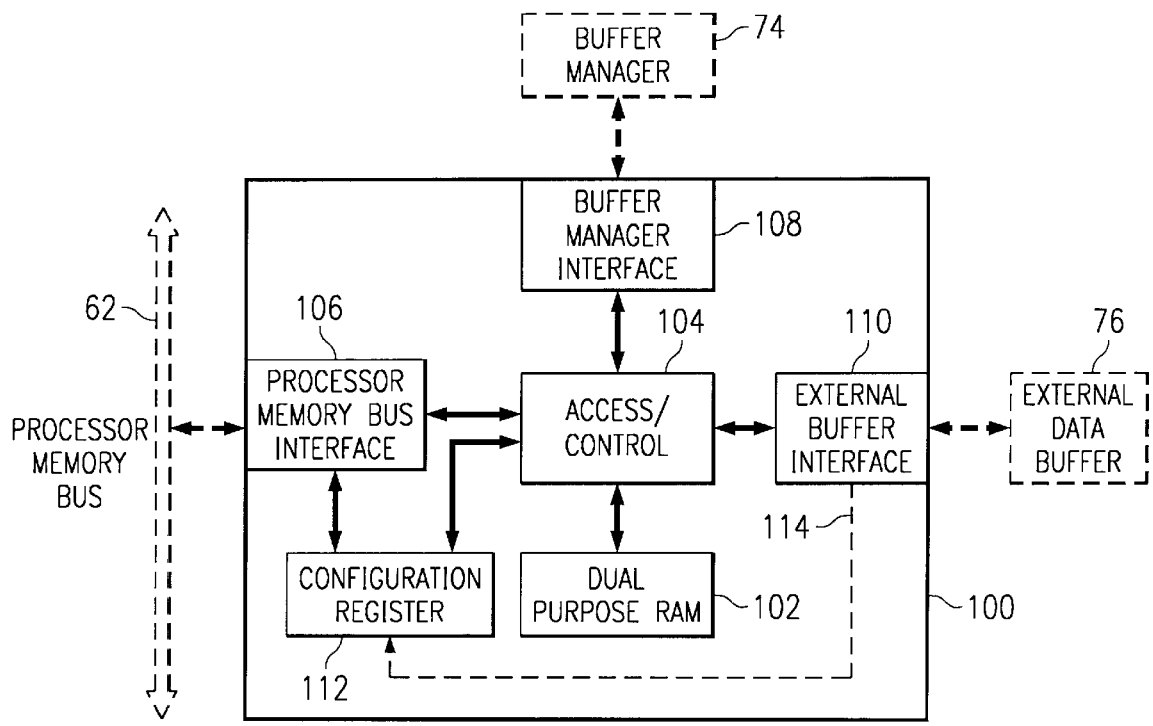
FIG. 3 is a schematic illustration of an exemplary buffer system having a memory device and a control circuit in accordance with an aspect of the present invention.

Referring now to FIG. 3, an exemplary disk drive buffer system 100 is illustrated, which may be advantageously employed in both low performance, cost sensitive disk drive systems, as well as in high performance drive systems. The system 100 is adapted for electrical interconnection with a processor memory bus 62 and a buffer manager 74, such as those illustrated and described above with respect to FIG. 2. The exemplary buffer system 100 comprises a first memory device 102, such as a RAM, which may be used alternatively or in combination as buffer memory or execution memory. The system further comprises a control circuit 104 in electrical communication with the first memory device 102, and interfaces 106 and 108 for providing electrical communication between the control circuit 104 and the buffer manager 74 and the processor memory bus 62, respectively. The control circuit 104 is adapted to provide electrical communication between the first memory device 102, and one of the processor (e.g., processor 52) via bus 62, and the buffer manager 74 using one of the first and second interfaces 106 and 108, respectively, according to a control state (not shown).

The buffer system 100 may further comprise a third interface circuit 110 in electrical communication with the control circuit 104, which provides electrical communication with a second or external memory device, such as the external data buffer device 76, associated with the disk drive. In this regard, the control circuit 104 may selectively provide electrical communication between the first memory device 102 and one of the processor bus 62 and the buffer manager 74, and to selectively provide electrical communication between the second memory device 76 and the other of the processor bus 62 and the buffer manager 74 according to the control state.

For instance, the control state may comprise first and second states, wherein the control circuit 104 connects the first memory device 102 to the processor bus 62 using interface circuit 106, and connects the second (e.g., external) memory device 76 to the buffer manager 74 using interface circuit 108 if the control state is in the first state. In this configuration, the first memory 102 may be used by the processor (e.g., processor 52) as fast access scratchpad memory and/or for instruction storage, while the buffer manager 74 may use the second or external data buffer memory 76 for buffering data being transferred to or from disk. This provides for high performance memory allocation, such as where a large buffer is needed, and where the processor needs fast access to data and/or instructions. Where a disk drive design is more cost sensitive, the buffer system 100 may be employed to provide some buffer memory via the RAM device 102. In this regard, the control circuit 104 is adapted to provide electrical communication between the first memory device 102 and the buffer manager 74 using the second interface 108 if the control state is in the second state.

The control state of the control circuit 104 may be configurable using a control configuration register 112 associated with the control circuit and wherein the control register is adapted to be programmed by the processor 52 using the processor bus 62. Thus, the control state of the control circuit 104 may be determined according to the programming of the processor 52 in the processor subsystem 54. Alternatively or in combination, the control state of the control circuit 104 may be configurable using a signal 114 from the third interface 110. The signal 114 may indicate, for example, whether the second memory device 76 is electrically connected with the third interface circuit 110. For example, the interface 110 may comprise a socket adapted to receive an external data buffer 76, and the presence of such a device 76 in the socket of interface 110 may generate the signal 114. It will be appreciated that the signal 114 may alternatively be applied directly to the control circuit 104, or to the configuration register 112.

Figure 4:
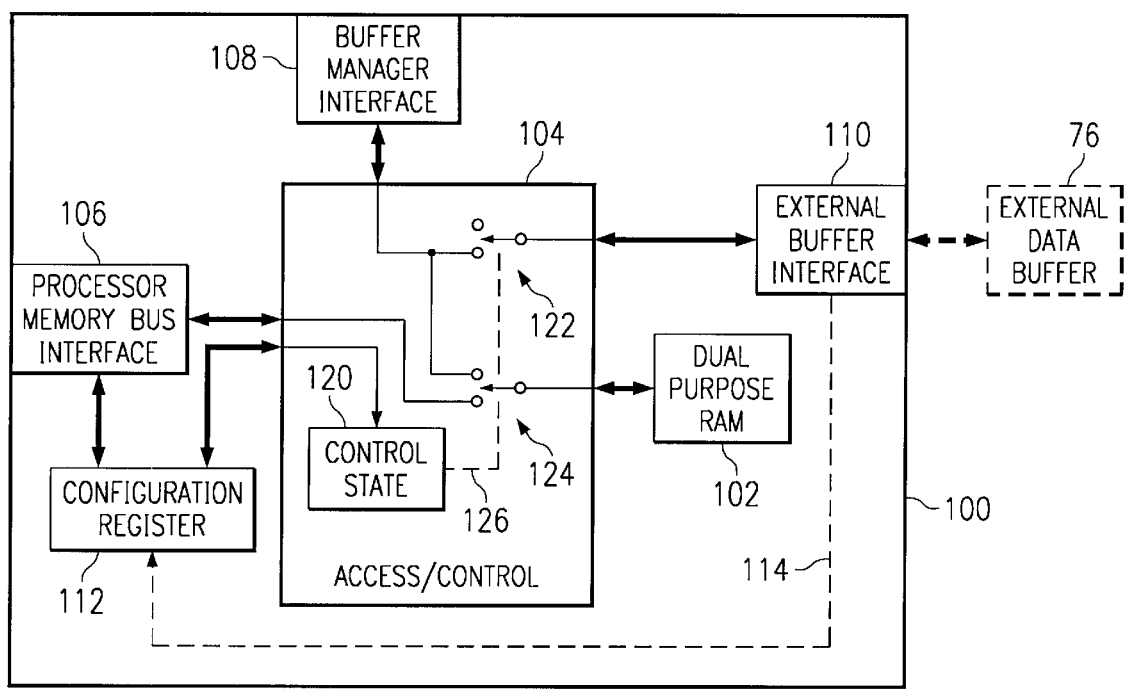
FIG. 4 is a schematic illustration of an exemplary control circuit of the exemplary buffer system of FIG. 3.

The control circuit 104 may comprise many different circuits in order to provide for selective connection of the memory 102 with one of the buffer manager 74 and the processor bus 62 in accordance with the invention. Referring now to FIG. 4, an exemplary control circuit 104 is illustrated in the buffer system 100. The control circuit 104 comprises a control state 120 which may be configured using the configuration register 112, which in turn may be programmed via instructions from a processor (e.g., processor 52) and/or via the signal 114 from the third interface circuit 110 (e.g., indicating the presence of an external data buffer 76). The control circuit 104 may further comprise switching devices 122 and 124 adapted to provide electrical communication between the first memory device 102, the interface 110 to the external data buffer 76, the buffer manager interface 108, and the processor bus interface 106, as described hereinafter.

In this regard, it will be appreciated that the memory devices 76 and 102 may be parallel access devices, and the switching devices 122 and 124 may comprise a plurality of electrical connections for interfacing the memory devices 76 and 102 with one or both of the interfaces 106 and 108 according to the control state 120 of the control circuit 104. For example, the switching devices 122 and 124 may comprise multiplexers or other switching circuits operable according to a control signal 126. In addition, the control state may comprise a memory register, flip-flop, or other form of circuitry adapted for providing a state to the switching devices 122 and 124. Switching devices 122 and 124 may be controlled via the signal 126 from the control state 120, whereby in a first state, device 122 provides electrical communication between the interfaces 108 and 110 (e.g., to allow the buffer manager 74 to access the external data buffer memory device 76). In this state, the switching device 124 provides electrical communication between the first memory device 102 and the interface 106 (e.g., thereby allowing the memory 102 to be accessed by the processor 52 via bus 62.

Thus, the buffer system 100 may be advantageously employed in high performance disk drive systems which require large external buffers 76 (e.g., where the required buffer is larger that the internal memory 102), and may further interface the internal memory 102 for use by the processor 52 via the interface 106 and the bus 62 as needed (e.g., for scratchpad and/or instruction storage usage). Where there is no external memory device 76 present in the system, moreover, the switching device 124 may provide electrical communication between the memory device 102 and the buffer manager interface 108, whereby the memory 102 may be advantageously employed as a buffer memory, for example, in a more cost sensitive disk drive system design.

Figure 5:
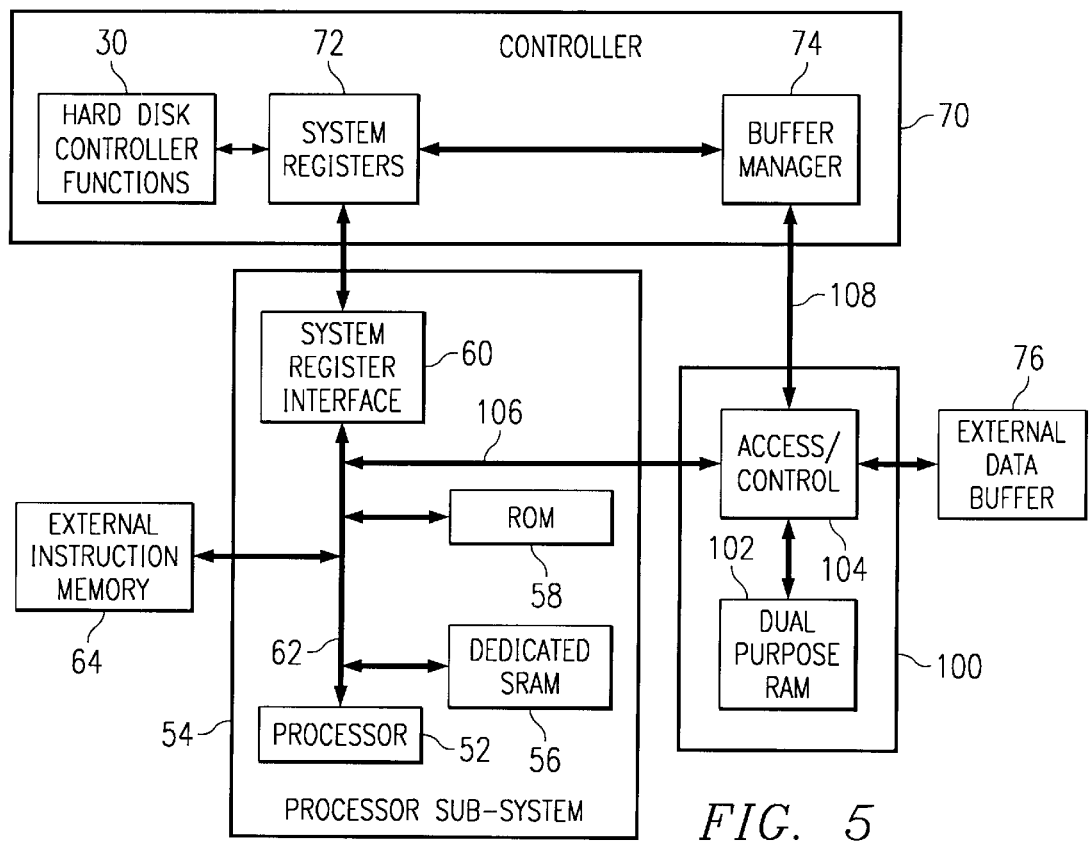
FIG. 5 is a schematic illustration of an exemplary disk drive system controller, processor, and associated memory system, and an exemplary buffer system selectively providing access to an internal memory device and to an external data buffer according to the invention.

Referring now to FIGS. 5 and 6, the exemplary disk drive processor 52 and associated memory is illustrated in combination with the exemplary buffer system 100 according to another aspect of the invention. The components illustrated in FIGS. 5 and 6 may be advantageously employed as part of a disk drive system (e.g., system 2 of FIG. 1) within the scope of the present invention. For example, where the disk drive system comprises an external data buffer memory device 76 as illustrated in FIG. 5, the buffer system 100 may provide access between the buffer manager 74 and the data buffer 76 via the interface 108 and the control circuit 104. In this situation, the control circuit 104 may also provide electrical communication between the internal memory 102 and the processor 52 via the interface 106 and the processor memory bus 62. As illustrated in FIG. 6, where no external data buffer memory is provided (e.g., such as in a low cost and/or low performance disk drive system), the buffer system 100 may provide electrical communication between the buffer manager 74 and the memory device 102, whereby a buffer may be provided.

Although one of the memory devices 102 and 76 may be electrically connected to the buffer manager 74 via the interface 108 and the control circuit 104 of the buffer system 100 to thereby provide for buffer memory usage thereof, it will be appreciated that the processor 52 may alternatively or in combination access the buffer memory via the system registers 72 and the system register interface 60. In this manner, some or all of the buffer memory (e.g., memory device 76 and/or 102) may be thus accessed by the processor 52, and used as execution memory for instructions and/or variable data storage. In this regard, it will be appreciated that processor 52 may still access the buffer memory for data and/or instruction storage, but this access is provided via the buffer manager 74. Accordingly, the buffer manager 74 may arbitrate access to the buffer memory between access by the processor 52 and other system resources (e.g., disk drive 10).

Referring now to FIG. 7, an exemplary method 200 is illustrated for providing buffer memory in a disk drive system. Beginning at step 202, the method 200 determines whether an external memory (e.g., external data buffer 76 of FIGS. 2–5) is installed in the disk drive system at decision step 204. If no external memory is installed (e.g., as illustrated in FIG. 6), a buffer manager (e.g., buffer manager 74) is connected with an internal memory (e.g., memory device 102) at step 206. This may be accomplished, for example, using the control circuit 104. However, if an external memory is installed in the system, the processor (e.g., processor 52) is connected with the internal memory device at step 208, and the buffer manager is connected with the external memory device at step 210 (e.g., as illustrated in FIG. 5. Thereafter the method ends at step 212.

Although the invention has been shown and described with respect to a certain implementation or implementations, it will be appreciated by those skilled in the art that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several implementations or applications of the invention, such feature may be combined with one or more other features of the other implementations as may be desired and advantageous for any given or particular application. Furthermore, to the extent that the term, "includes", "has", "having", and/or variants thereof are used in either the detailed description or the claims, such terms are intended to be inclusive in a manner similar to the terms "comprises" and "comprising".

What is claimed is:

1. A peripheral storage device buffer system, comprising:
    a first memory device;
    a control circuit in electrical communication with the first memory device, a processor associated with the peripheral storage device, and a buffer manager associated with the peripheral storage device, the control circuit having a control state associated therewith;
    wherein the control circuit is adapted to selectively provide electrical communication between the first memory device and one of the processor and the buffer manager according to the control state, and
    wherein the control circuit is in electrical communication with a second memory device associated with the peripheral storage device, and wherein the control circuit is adapted to selectively provide electrical communication between the first memory device and one of the processor and the buffer manager, and to selectively provide electrical communication between the second memory device and the other of the processor and the buffer manager according to the control state.

2. The buffer system of claim 1:
    wherein the control state comprises one of a first state and a second state;
    wherein the control circuit is adapted to provide electrical communication between the first memory device and the processor and to provide electrical communication between the second memory device and the buffer manager if the control state comprises the first state; and
    wherein the control circuit is adapted to provide electrical communication between the first memory device and the buffer manager if the control state comprises the second state.

3. The buffer system of claim 2, wherein the control state is configurable using a control register associated with the control circuit and wherein the control register is adapted to be programmed by the processor.

4. The buffer system of claim 2, wherein the control state is configurable using a signal indicative of whether the second memory device is electrically connected with the buffer system.

5. The buffer system of claim 4, wherein the control state comprises the first state if the signal indicates that the second memory device is electrically connected with the buffer system and wherein the control state comprises the second state if the signal indicates that the second memory device is not electrically connected with the buffer system.

6. A peripheral storage device system comprising:
   a peripheral storage device providing information storage for a host computer system;
   a controller with a buffer manager circuit electrically connected with the peripheral storage device, wherein the controller is adapted to control the operation of the peripheral storage device;
   a processor electrically connected to the controller; and
   a peripheral storage device buffer system, comprising:
      a first memory device; and
      a control circuit in electrical communication with the first memory device, the processor, and the buffer manager circuit, the control circuit having a control state associated therewith;
      wherein the control circuit is adapted to selectively provide electrical communication between the first memory device and one of the processor and the buffer manager circuit according to the control state,
      wherein the control circuit is in electrical communication with a second memory device associated with the peripheral storage device, and wherein the control circuit is adapted to selectively provide electrical communication between the first memory device and one of the processor and the buffer manager circuit, and to selectively provide electrical communication between the second memory device and the other of the processor and the buffer manager circuit according to the control state.

7. The peripheral storage device system of claim 6:
   wherein the control state comprises one of a first state and a second state;
   wherein the control circuit is adapted to provide electrical communication between the first memory device and the processor and to provide electrical communication between the second memory device and the buffer manager circuit if the control state comprises the first state; and
   wherein the control circuit is adapted to provide electrical communication between the first memory device and the buffer manager circuit if the control state comprises the second state.

8. The peripheral storage device system of claim 7, wherein the control state is configurable using a control register associated with the control circuit and wherein the control register is adapted to be programmed by the processor.

9. The peripheral storage device system of claim 7, wherein the control state is configurable using a signal indicative of whether the second memory device is electrically connected with the buffer system.

10. The peripheral storage device system of claim 9, wherein the control state comprises the first state if the signal indicates that the second memory device is electrically connected with the buffer system and wherein the control state comprises the second state if the signal indicates that the second memory device is not electrically connected with the buffer system.

11. A method for providing buffer memory in a peripheral storage device system, comprising:
   electrically connecting a buffer system with a buffer manager and a processor associated with the peripheral storage device system, the buffer system having a first memory device and a control device with a control state associated therewith;
   selectively providing electrical communication between the first memory device and the processor using the control device if the control state comprises a first state;
   selectively providing electrical communication between the first memory device and the buffer manager using the control device if the control state comprises a second state, and
   selectively providing electrical communication between a second memory device associated with the peripheral storage device system and the buffer manager using the control device if the control state comprises the first state.

* * * * *